US 6,718,670 B2

(12) United States Patent
Wang

(10) Patent No.: US 6,718,670 B2
(45) Date of Patent: Apr. 13, 2004

(54) TRIANGULAR WARNING SIGN

(75) Inventor: Wencai Wang, Tianjin (CN)

(73) Assignee: S.G. New Technology Development Company Tianjin, Tianjin (CN)

( * ) Notice: Subject to any disclaimer, the term of this patent is extended or adjusted under 35 U.S.C. 154(b) by 0 days.

(21) Appl. No.: 10/238,185

(22) Filed: Sep. 10, 2002

(65) Prior Publication Data

US 2003/0196361 A1 Oct. 23, 2003

(30) Foreign Application Priority Data

Apr. 17, 2002 (CN) ........................................ 02232572 U
Jun. 7, 2002 (CN) ........................................ 02120887 A

(51) Int. Cl.⁷ ................................................. E01F 9/10
(52) U.S. Cl. ........................... 40/610; 116/63 T; 40/903
(58) Field of Search ........................... 40/610, 612, 903; 116/63 T

(56) References Cited

U.S. PATENT DOCUMENTS

| 3,773,012 A | * | 11/1973 | Lindner et al. ............ 116/63 P |
| 3,933,119 A | * | 1/1976 | Hedgewick et al. ....... 116/63 P |
| 3,934,541 A | * | 1/1976 | May et al. ................. 116/63 T |
| 4,805,550 A | * | 2/1989 | Raczkowski et al. ..... 116/63 T |
| 5,195,264 A | | 3/1993 | Johanson et al. |

* cited by examiner

Primary Examiner—Cassandra H. Davis
(74) Attorney, Agent, or Firm—Seyfarth Shaw LLP

(57) ABSTRACT

A triangular warning sign for traffic safety having a structural shape of inner and outer equilateral triangles. The sign has a counterweighed supporting place which provides for stability. The sign can also be folded and stored in a box.

13 Claims, 4 Drawing Sheets

TRIANGULAR WARNING SIGN

TECHNICAL FIELD OF THE INVENTION

The present invention relates to a warning sign for traffic safety of vehicles, more particularly to a collapsible triangular warning sign which can be put on the road when the vehicle gets temporary trouble so that other vehicles passing by can find the trouble warning sign as early as possible and have sufficient time and a safe distance to get out the way to prevent collision of vehicles.

BACKGROUND ART

A collapsible triangular sign is disclosed in U.S. Pat. No. 5,195,264. It presents a shape of equilateral triangle, and includes an outer triangular passive light-reflecting surface made from plastic optical fully-reflected strip, and an inner triangular fluorescent shining surface made from fluorescent plate. The plastic optical fully-reflecting strip is inserted in the outside of a triangular frame, and the fluorescent plate is integrated with the triangular frame and positioned at its inner side, the two lateral components of the triangular frame can be rotated about its pivot axis on the bottom component respectively. At one of the bottom corners of the triangular frame, there is hinged a carrier arm, the triangular warning sign can be hung extending from window glass at either side of the vehicle via the carrier arm. Thus, the vertical incident angle of light is heightened, and interfering with the visible distance. However, owing to that the triangular warning sign is hung from window glass to project from the vehicle body at either side, it is liable to be scratched and rubbed by other vehicles passing by. While the triangular warning sign is limited by its structural form, it can't be put on the road and keeping a certain distance away from the trouble vehicle. Therefore it has the drawback in that the safe warning distance is shortened.

SUMMARY OF THE INVENTION

One object of the present invention is to provide a triangular warning sign which can be put on the road on the front of or behind from the trouble vehicle at a certain distance, such that the drivers of other vehicles passing and meeting there are warned and have sufficient time and distance to take emergent measure to get out the way in order to ensure safety in driving.

Another object of the invention is to provide a triangular warning sign, the parts of which can be formed seperately then assembled by insertion so that the volume of forming dies can be largely diminished.

Yet another object of the invention is to provede a triangular warning sign, whose plastic optical fully reflecting strip can be formed from organic glass material once formed by injection moulding through precise super-finished dies, so that generation of strong, oriented, retro-reflected light can be ensured.

Yet another object of the invention is to provide a triangular warning sign, which utilizes a structure of one counterweighed supporting plate and four supporting legs so that the stability against wind after putting can be ensured.

Yet another object of the invention is to provide a triangular warning sign, wherein the edge components of the triangular frame and of the inner fluorescent plate triangle are formed seperately, such that the two triangles can be made in different colours, and the triangular frame can be made without fluorescent material, so that the fluorescent material can be saved, and decorating effect can be enhanced.

Yet another object of the invention is to provide a triangular warning sign, which can be folded up as an elongated pack encased in a plastic box, thus it is portable and can be deployed quickly.

The triangular warning sign of the present invention is in the structural form of inner and outer equilateral triangles. The inner equilateral triangle is a fluorescent shining surface, and the outer equilateral triangle is a plastic optical passive light-reflecting surface. The sign includes: a triangular frame; a narrow positioning insert block and some flat positioning pins integrated with the bottom edge of triangular frame; six plastic optical fully-reflecting strips secured on the front and rear faces of three edges of triangular frame by ultrasonic welding; three fluorescent plates inserted into slots on the inner side of triangular frame to form double-faced fluorescent shining surfaces of an inner triangle; a counterweighed supporting plate positioned below the triangular frame; a narrow positioning insert block and some flat positioning pins for connecting the triangular frame and the counterweighed supporting plate; the fixed cuffs for enveloping the two ends of counterweighed supporting plate; four supporting legs hinged at the two ends of counterweighed supporting plate respectively; a narrow positioning insert block at the middle of bottom edge of the triangular frame inserted into the fixed seats of supporting legs which are used to secure the said four legs after they are folded up; and the rubber rings positioned at the ends of supporting legs.

Wherein said plastic optical fully-reflecting strips are made from organic glass material and once injection molded by a precise super-finished die which is invented by the applicant, therefore a strong, oriented retro-reflected light and a distant visibility can be ensured. Generally, when running a car at night, by illuminating with front lamps of the car, the driver can see clearly the triangular warning sign at a distance greater than 300 m, accordingly the driver would have sufficient time and distance to take measure to brake and emergently get out the way, thus a traffic accident can be avoided.

As the plastic optical fully-reflecting strips are secured on the front and back faces of three edge components of the triangular frame by ultrasonic welding, a good seal is obtained. Even though it is raining at night, its light-reflecting property is not yet affected. The said plastic optical fully-reflecting strips are welded in the depressions of three edge components of triangular frame, these strips are in full fit with the depressions and occupy almost the whole area of edge components. These strips and the triangular frame together compose the outer triangle of the triangular warning sign, serving as the optical fully-reflecting part at night.

Both faces of the three fluorescent plates are fluorescent surfaces which are used mainly to shine at daytime. One can find clearly the shining triangular fluorescent plates at a distance greater than 200 m. The three fluorescent plates are inserted in the narrow slots on the inside of three edge components of the triangular frame, and compose an inner equilateral triangle, then at the places where some lugs having a form of double cylinders with narrow slots project inward from three edge components of the triangular frame, secure the said three fluorescent plates which are inserted in narrow slots on the inside of three edge components of the triangular frame by using of fasteners, preferably by riveting with rivets. While the two fasteners positioned at the two ends of bottom edge of the triangular frame also can be used as the pivot axes for rotating the two lateral components of the triangular frame relative to its bottom edge, thereby the two lateral components of the triangular frame can be foldably rotated with the two fasteners at the two ends of said bottom edge as rotating centers respectively.

As the plastic optical fully-reflecting strips are welded at the front and back faces of triangular frame, and both faces of three fluorescent plates are fluorescent surfaces, therefore whether other vehicles come from the front or run behind, they all can see the triangular warning sign from two opposite directions.

The tip portions of the two lateral components of the triangular frame are staggerd and overlapped with each other. The said tip portions are mounted with snap fasteners by fusion, by which the two lateral components can be engaged with each other, thereby form an equilateral inner and outer triangular warning sign.

Along the bottom edge of the triangular frame, there provided some flat positioning insert pins and a narrow positioning insert block, while on the counterweighed supporting plate, there provided some elongated rectangular insert holes which fit with the said flat positioning insert pins. The flat positioning insert pins, each having a resilient hook on it, after inserted in the insert holes of the supporting plate, can be secured in the holes. The counterweighed supporting plate further has a central opening, a supporting leg fixed seat is inserted in the central opening and assembled with the said narrow positioning insert block by insertion.

The supporting legs fixed seat has four semicircular grooves used to engage and secure said four supporting legs after they have been folded up. Each of the two ends of the counterweighed supporting plate is provided with two hinge holes which can accommodate the bent ends of two supporting legs. A fixed cuff envelops each of the two end portions of the counterweighed supporting plate which cooperates with the fixed cuffs and restrains the supporting legs to rotate excessively. The maximum angle that the supporting legs can stretch out is greater than 90°.

At the end portions of the four supporting legs there provided a rubber ring for each of the legs in order to eliminate the vibration noise between the supporting legs and the counterweighed supporting plate after the legs having been folded up.

Some positioning tabs for folding are disposed on the triangular frame, such that after the triangular frame has been folded up, the said positioning tabs can define the position that the triangular frame should be folded into, thereby ensuring the folded triangular frame not easy to be loosed.

After folding up, the triangular warning sign presents an elongated pack which can be inserted into a rectangular plastic box with a cover, such that it can be handled and stored easily.

DESCRIPTION OF THE BEST MODE OF EMBODIMENT

Figure 1:
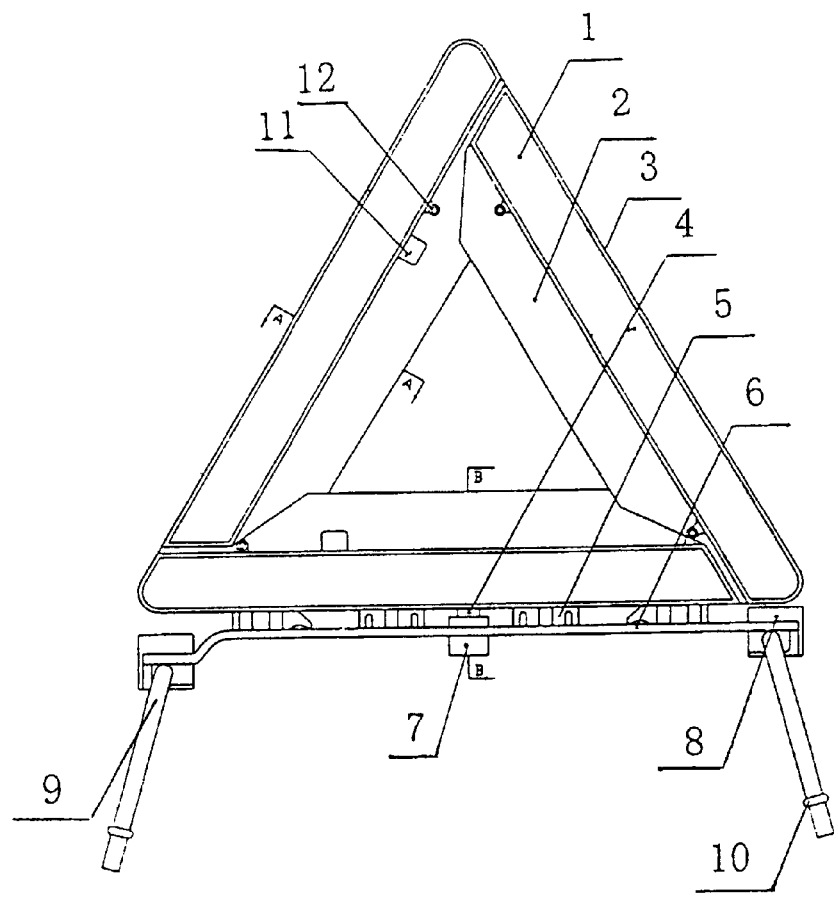
FIG. 1 is a front main view of a triangular warning sign of the present invention when it is fully deployed.

The best mode to embody a triangular warning sign of the present invention will be described in the following by reference with accompanying drawings, in which the same reference numeral denotes the parts of identical structure.

Figure 2:
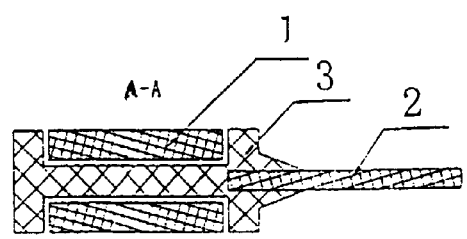
FIG. 2 is a fragmental sectional view taken along line A—A of FIG. 1 showing the identical structure of two lateral components of a triangular warning sign.
Figure 3:
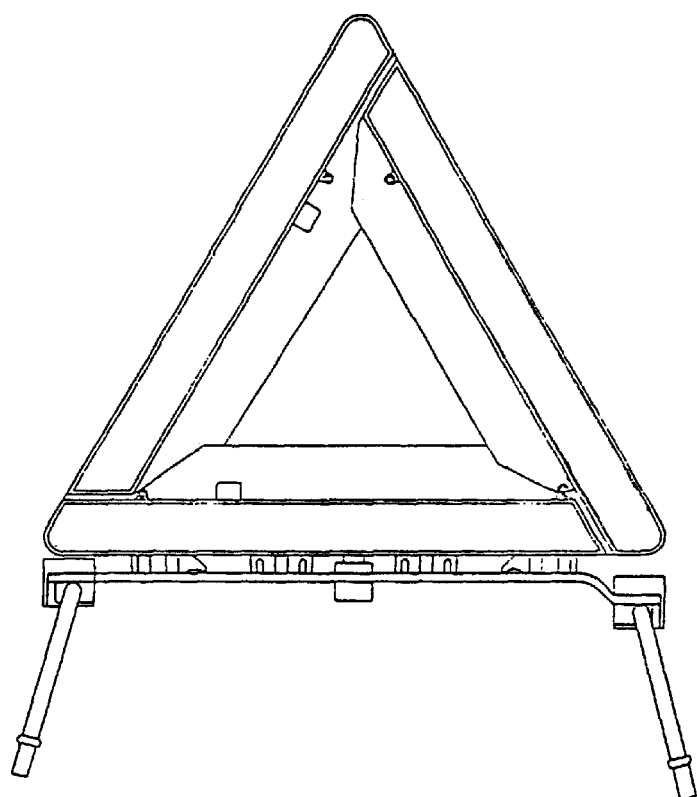
FIG. 3 is a rear main view of a triangular warning sign of the present invention showing that the rear structure is identical with the front structure.
Figure 4:
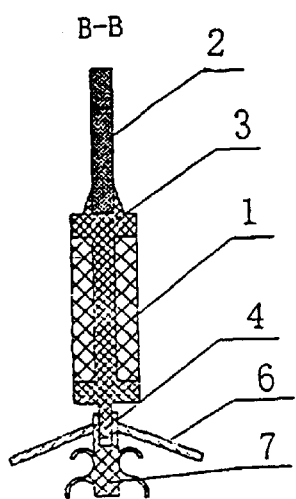
FIG. 4 is a fragmental sectional view taken alone line B—B of FIG. 1 showing the structure of the bottom edge of a triangular warning sign.

FIG. 1 is a front main view of a triangular warning sign of the present invention when it is fully deployed, showing the front aspect of its working condition. FIG. 2 is a fragmental sectional view taken along ling A—A of FIG. 1 showing the identical structure of two lateral components of a triangular warning sign. FIG. 3 is a rear main view of a triangular warning sign of the present invention when it is fully deployed, showing the rear structure is identical with the front structure. FIG. 4 is a fragmental sectional view taken along line B—B of FIG. 1, showing the structure of the middle portion of bottom edge of a triangular warning sign.

Referring to FIGS. 1–4, the triangular warning sign of the present invention is in the structural form of inner and outer equilateral triangles. The inner equilateral triangle is a fluorescent shining surface, and the outer equilateral triangle is a plastic optical light-reflecting surface. The sign includes: a triangular frame 3; a narrow positioning insert block 4 and some flat positioning pins 5 integrated with the bottom edge of triangular frame 3; six plastic optical fully-refleting strips 1 secured on the front and rear faces of three edges of triangular frame 3 by ultrasonic welding; three fluorescent plates 2 inserted into the slots on the inner side of triangular frame 3 to form double-faced fluorescent shining surfaces of on inner triangle; a counterweighed supporting plate 6 positioned below the triangular frame 3; a narrow positioning insert block 4 and some flat positioning pins 5 for connecting the triangular frame 3 and the counterweighed supporting plate 6; fixed cuffs 8 for enveloping the two ends of counterweighed supporting plate 6; four supporting legs 9 hinged at the two ends of counterweighed supporting plate 6 respectively; a narrow positioning insert block 4 at the middle of bottom edge of the triangular frame 3 is inserted into the fixed seats 7 of supporting legs which are used to secure the said four legs 9 after they are folded up; and the rubber rings 10 positioned at the ends of supporting legs 9.

Wherein the triangular frame 3 must be made from ABS engineering plastics, and the said plastic optical fully-reflecting strips 1 are made from organic glass material, such as by injection molding through precise super-finished die which is invented by the applicant, a strong retro-reflected light and a distant visibility can be ensured, which are in conformity with the provisions and requirements of USA DOT Standard No. 125.

Generally, when a car runs at night, by illuminating with front lamps of the car, the driver can see clearly the triangular warning sign at a distance greater than 300 m, accordingly the driver would have sufficient time and distance to take measure to brake and emergently get out the way, thus a traffic accident can be avoided.

As the plastic optical fully-reflecting strips 1 are secured on the front and rear faces of three edge components of the triangular frame by ultrasonic welding, a special waterproof property is obtained, even though it is raining at night, its light-reflecting property is not yet affected.

The said plastic optical fully-reflecting strips 1 are welded in the depressions of three edge components of triangular frame 3. These strips are in full fit with the depressions and occupy almost the whole area of edge componets. These strips and the triangular frame together compose the outer triangle of the triangular warning sign, serving as the optical fully-reflecting part at night.

Both faces of the three fluorescent plates 2 are fluorescent surfaces which are used mainly to shine at daytime. One can find clearly the shining triangular fluorescent plates at a distance greater than 200 m. The fluorescent plates are inserted in narrow slots on the inside of three edge components of the triangular frame 3, and compose an inner equilateral triangle, then at the places where some lugs 12 having a form of double cylinders with narrow slots project inward from three edge components of the triangular frame 3, secure the said three fluorescent plates 2 which are inserted in narrow slots on the inside of three edge components of the triangular frame 3 by using of fasteners 14, preferably by riveting with rivets.

The two fasteners positioned at the two ends of bottom edge of the triangular frame 3 can be used as pivot axes for rotating the two lateral components of the triangular frame 3 relative to its bottom edge, thereby the two lateral components of the triangular frame 3 can be foldably rotated with the two fasteners 14 at the two ends of said bottom edge as rotating centers respectively. the two fasteners at the two ends of said bottom edge as rotating centers respectively.

As the plastic optical fully-reflecting strips 1 are welded at the front and rear faces of triangular frame 3, and both faces of three fluorescent plates 2 are fluorescent surfaces, therefore whether other vehicles come from the front or run behind, they all can from two opposite directions see the triangular warning sign. Furthermore, in the setting process of the triangular warning sign, as it needs not to distinguish a positive face and an opposite face, setting speed can be increased and setting error can be reduced.

Figure 5:
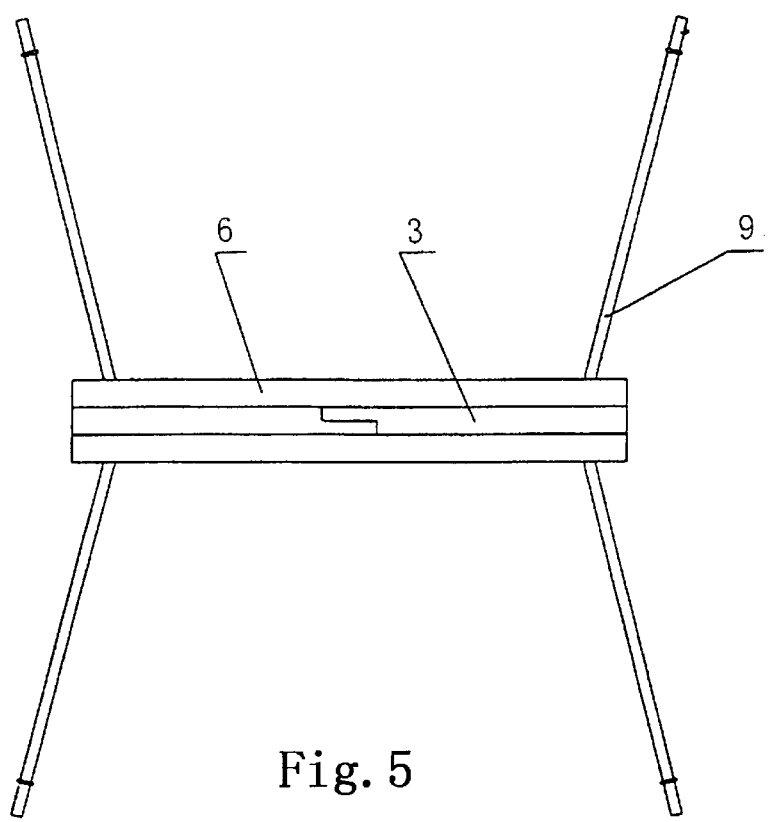
FIG. 5 is a top view of a triangular warning sign of the present invention when it is fully deployed.
Figure 7:
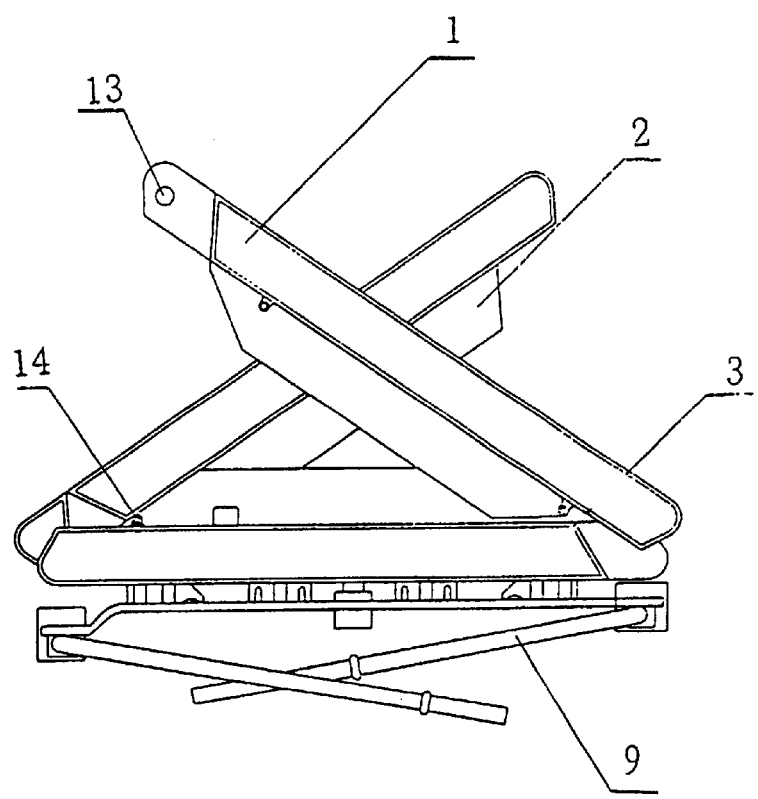
FIG. 7 is a schematic view showing a triangular warning sign of the present invention being in the folding process.

Referring to FIGS. 5 and 7, the tip portions of the two lateral components of the triangular frame 3 are staggered and overlapped with each other. Said tip portions are mounted with snap fasteners 13 by fusion, by which the two lateral components can be engaged with each other, thereby form an equilateral inner and outer triangular warning sign.

Figure 6:
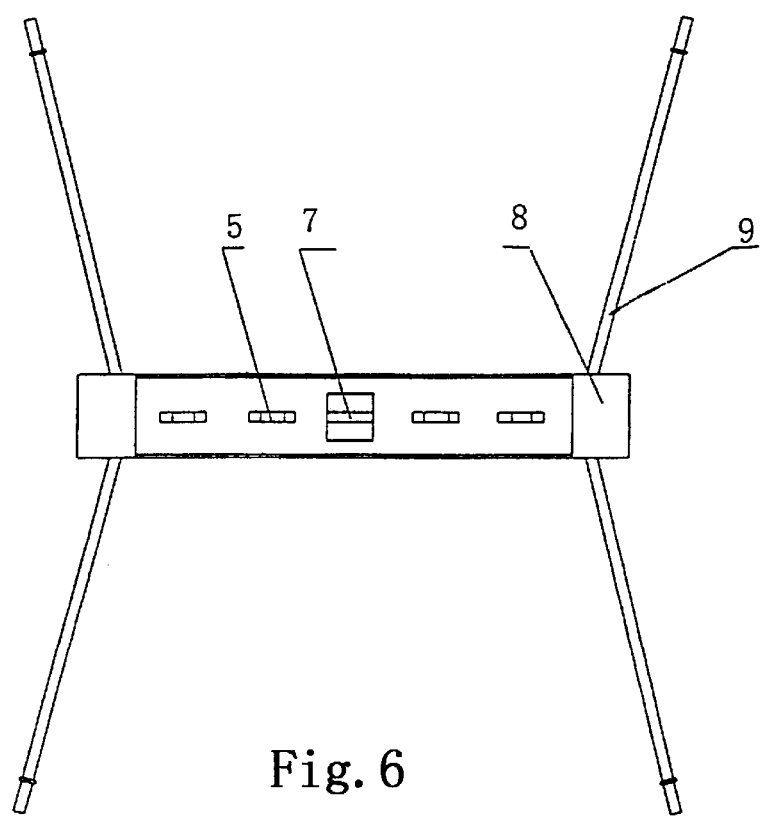
FIG. 6 is a bottom view of a triangular warning sign of the present invention when it is fully deployed.

Referring to FIGS. 1 and 6, along the bottom edge of the triangular frame 3, there provided with some flat positioning insert pins 5 and a narrow positioning insert block 4, while on the counterweighed supporting plate 6, there provided with some elongated rectangular insert holes which fit with the said flat positioning insert pins 5. The flat positioning insert pins 5, each having a resilient hook on it, after inserted in the insert holes, can be secured in the holes and connect the triangular frame 3 and the counterweighed supporting plate 6. The counterweighed supporting plate 6 further has a central opening, a supporting leg fixed seat 7 is inserted in the central opening and assembled with the said narrow positioning insert block 4 by insertion. The supporting leg fixed seat 7 has four semicircular grooves used to engage and secure the said four supporting legs 9 after they have been folded up.

Each of the two ends of the counterweighed supporting plate 6 is provided with two hinge holes which can accommodate two supporting legs 9 having a bent end. A fixed cuff 8 envelops each of the two end portions of the counterweighed supporting plate 6, which cooperates with the fixed cuffs 8 and restraing the supporting legs 9 not to rotate excessively. The maximum angle that the supporting legs 9 can stretch out should be greater than 90°.

As the weight of the counterweighed supporting plate 6 and that of the said triangular frame 3 are adequately matched, when put on the road, they have a good stability against the wind. The design of supporting legs is excellent and reasonable, the warning sign of the present invention can be folded up to a small volume.

At the end portions of the four supporting legs 9, there provided with a rubber ring for each of the legs in order to eliminate the vibration noise between the supporting legs 9 and the counterweighed supporting plate 6 after the legs have been folded up.

Referring to FIG. 1, some positioning tabs 11 for folding are disposed on the triangular frame 3, such that after the triangular frame 3 has been folded up, said positioning tabs 11 can define the position that the triangular frame 3 should be folded into, thereby ensuring the folded triangular frame not easy to be loosed.

Figure 8:
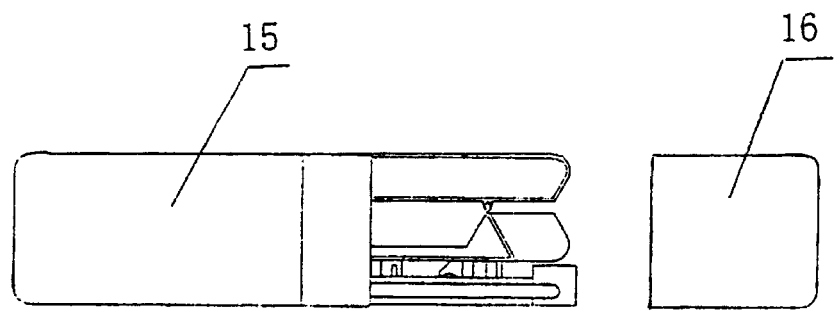
FIG. 8 is a schematic view showing a triangular warning sign of the present invention having been folded up and packed into a plastic box.

Referring to FIG. 8, after folded up, the triangular warning sign presents an elongated pack which can be inserted into a rectangular plastic box 15 with a plastic cover 16 putting on it, such that it can be handled easily.

Said snap fasteners 13 disposed on the staggered tip portions of two lateral components of triangular frame 3 are a pair of coupling members with concave and convex parts engaged with each other, they can be replaced, of course, by its equivalent such as two magnets which can attract with each other.

Preferably, the double faces of fluorescent plates 2 of the triangular warning sign of the present invention both have an orange colour, it can be accomplished by film coating, film adhering or by using the mixture of fluorescent material and plastics as basic material for injection molding.

Preferably, the counterweighed supporting plate of the triangular warning sign of the present invention is provided with a central opening and four elongated rectangular through holes whose size and position are adapted fo be engaged with the four flat positioning pins 5.

Preferably, for the triangular frame 3 of the present invention, both ends of each of the edge components are provided with an inward projected double-cylinder shaped lug 12 with a narrow slot, wherein the double-cylinder shaped lugs 12 located at the two ends of the bottom edge component of the triangular frame are used as pivoting centers for the two lateral edge components.

Preferably, the fasteners passing through the central holes of said double-cylinder shaped lugs 12 are cylindrical rivets.

Preferably, the tip portions of the two lateral edge components of the triangular frame are staggered and overlapped in a close fit, such that it seems as if the plastic optical fully reflecting strips form an integral triangle.

Owing to that the parts of triangular frame and of fluorescent plates of the triangular warning sign of the invention can be formed separately, then assembled by insertion so that the volume of forming dies can be largely diminished, and the amount of fluorescent material can be largely saved, also the triangular frame and the fluorescent plates can be made in different colors to enhance decorating effect.

Owing to that the plastic optical fully reflecting strips 1 of the invention are made from organic glass material formed by injection moulding through precise super-finished die which is invented by the applicant, therefore a strong retro-reflected light and a distant visibility can be ensured.

Owing to that the bottom portion of triangular warning sign of the invention uses a structure of one counterweighed supporting plate and four supporting legs so that the stability against wind after putting can be ensured.

Owing to that the frame and four supporting legs of triangular warning sign of the invention can be folded up as an elongated pack encased in a plastic box, thus it is easy to handle.

Although the prensent invention is described and illustrated in its best mode of embodiment, it will be understood that within the scope of the invention in real sense, there can be many variants and equivalent alternatives, all these variants and variations are intended to be included in the protected scope of the appended claims.

What is claimed is:

1. A triangular warning sign having a structural shape of inner and outer equilateral triangles, the inner equilateral triangle having a fluorescent shining surface and the outer equilateral triangle having a plastic optical light-reflecting surface, said sign comprising:

a triangular frame having frame edges with front and rear faces, respectively;

plastic optical fully-reflecting strips secured on each front and rear face;

three fluorescent plates inserted into slots on an inner side of the triangular frame to form double-faced fluorescent shining surfaces of an inner triangle;

a counterweighed supporting plate having two ends positioned below the triangular frame;

a narrow positioning insert block and at least one positioning pin integrated with a bottom edge of the triangular frame, wherein the narrow positioning insert block is inserted in a supporting legs fixed seat, and said at least one positioning pin is inserted in said counterweighed supporting plate;

fixed cuffs for enveloping two ends of counterweighed supporting plate; and supporting legs hinged at the two ends of counterweighed supporting plate, respectively;

wherein two lateral components of said triangular frame can be foldably rotated with the two fasteners at two ends of said bottom edge as rotating centers respectively;

two tip portions of said two lateral components of the triangular frame are staggered and overlapped with each other, said tip portions are mounted with snap fasteners by fusion, by which the two lateral components can be engaged with each other;

each of the two ends of said counterweighed supporting plate are provided with two hinge holes which can accommodate two supporting legs having a bent end;

said counterweighed supporting plate cooperating with the fixed cuffs and restraining the supporting legs from rotating excessively;

said counterweighed supporting plate and said triangular frame are adequately matched in weight, so that when put on a road they have a good stability against the wind.

2. The sign of claim 1, wherein said snap fasteners (13) are a pair of coupling members with concave and convex parts engaged with each other.

3. The sign of claim 1, wherein said snap fasteners (13) are a pair of magnets which can attract with each other.

4. The sign of claim 1, wherein the a rubber ring is disposed on each of the supporting legs in order to eliminate the vibration noise between the supporting legs and the counterweighed supporting plate.

5. The sign of claim 1, wherein said plastic optical fully reflecting strips are made from organic glass material and once formed by injection molding through the precise super-finished dies.

6. The sign of claim 1, wherein said fluorescent plates have an orange color.

7. The sign of claim 1, wherein said counterweighed supporting plate is provided with a central opening and at least one elongated rectangular through hole whose size and position are adapted to be engaged with the at least one positioning pin.

8. The sign of claim 1, wherein both ends of each of the edge components of the triangular frame are provided with an inward projected, double cylinder shaped lug with a narrow slot which is used to secure said fluorescent plate, said double-cylinder shaped lugs located at two ends of the bottom edge components of the triangular frame are used as the pivoting centers for the two lateral edge components.

9. The sign of claim 1, wherein said fasteners are cylindrical rivets.

10. The sign of claim 1, wherein the tip portions of the two lateral edge components of the triangular frame are staggered and overlapped, such that it seems as if the plastic optical fully reflecting strips form an integral triangle.

11. The sign of claim 1, wherein a plurality of positioning tabs for folding are disposed on the triangular frame, such that after the triangular frame has been folded up, said positioning tabs can define the position where the triangular frame should be folded into.

12. The sign of claim 1, wherein said supporting legs fixed seat has four semicircular grooves used to engage and secure said four supporting legs.

13. The sign of claim 1, wherein said triangular warning sign can be folded up into an elongated pack, which can be inserted into a rectangular plastic box with a cover.

* * * * *

UNITED STATES PATENT AND TRADEMARK OFFICE
CERTIFICATE OF CORRECTION

PATENT NO. : 6,718,670 B2
DATED : April 13, 2004
INVENTOR(S) : Wang

It is certified that error appears in the above-identified patent and that said Letters Patent is hereby corrected as shown below:

Column 7,
Line 55, "two" after the word "accommodate" should be -- the --.

Column 8,
Line 13, "the" after the word "wherein" should be deleted.

Signed and Sealed this

Twenty-eighth Day of December, 2004

JON W. DUDAS
*Director of the United States Patent and Trademark Office*